United States Patent [19]

Peters et al.

[11] Patent Number: 4,921,093
[45] Date of Patent: May 1, 1990

[54] INFEED MEANS FOR HIGH SPEED CONTINUOUS MOTION CAN DECORATOR

[75] Inventors: Arnold Peters, West Paterson; Theodore Hamot, Saddle Brook; Leonard Ver Hoven, Oak Ridge, all of N.J.

[73] Assignee: Sequa Corporation, New York, N.Y.

[21] Appl. No.: 191,693

[22] Filed: May 9, 1988

[51] Int. Cl.⁵ .................................. B65G 37/00
[52] U.S. Cl. ......................... 198/471.1; 101/40
[58] Field of Search ............ 198/471.1, 689.1, 803.5, 198/479.1, 481.1, 493, 392; 101/40; 118/46, 230

[56] References Cited

U.S. PATENT DOCUMENTS

| | | | |
|---|---|---|---|
| 2,500,465 | 3/1950 | Meyer | 198/478.1 |
| 3,548,745 | 12/1970 | Sirvet et al. | 198/471.1 X |
| 3,563,170 | 2/1971 | Cuacho et al. | 101/40 |
| 3,586,175 | 6/1971 | Gauld | 198/471.1 X |
| 3,612,313 | 10/1971 | Lehring, Jr. | 198/379 |
| 3,613,571 | 10/1971 | Russell et al. | 101/40 |
| 3,766,851 | 10/1973 | Sirvet et al. | 101/40 |
| 3,855,967 | 12/1974 | Skripek et al. | 118/230 |
| 3,913,724 | 10/1975 | Verjux | 198/468.4 |
| 3,976,187 | 8/1976 | Szpitalak | 198/479.1 |
| 4,048,917 | 9/1977 | Skrypek et al. | 101/40 |
| 4,138,941 | 2/1979 | McMillin et al. | 198/471.1 X |
| 4,140,053 | 2/1979 | Skrypek et al. | 101/40 |
| 4,337,719 | 7/1982 | vander Griendt et al. | 118/230 X |
| 4,458,804 | 7/1984 | Williams et al. | 198/478.1 |
| 4,509,555 | 4/1985 | Stirbis | 137/625.11 |
| 4,550,821 | 11/1985 | Horie et al. | 198/416 |
| 4,750,420 | 6/1988 | Shriver | 101/40 |
| 4,773,326 | 9/1988 | Hudec | 101/40 |

FOREIGN PATENT DOCUMENTS

| | | | |
|---|---|---|---|
| 2453699 | 5/1975 | Fed. Rep. of Germany | 198/392 |
| 178754 | 11/1982 | Japan | 101/40 |

Primary Examiner—Robert J. Spar
Assistant Examiner—Cheryl L. Gastineau
Attorney, Agent, or Firm—Mitchell D. Bittman; Jerome M. Berliner

[57] ABSTRACT

A high speed can decorator includes an infeed section having a rotating pocket wheel which receives cans from the downstream end of a chute wherein the cans arranged side by side. While being carried by the pocket wheel to a transfer region where these cans are moved axially from peripheral pockets of the pocket wheel to be received by mandrels that are mounted on a rotating mandrel wheel that is coaxial with the pocket wheel. Immediately after a can is seated within a pocket wheel, a suction force is applied to the side of the can to fully seat and stabilize same in the pocket. This suction force is applied until the can reaches the transfer region.

16 Claims, 5 Drawing Sheets

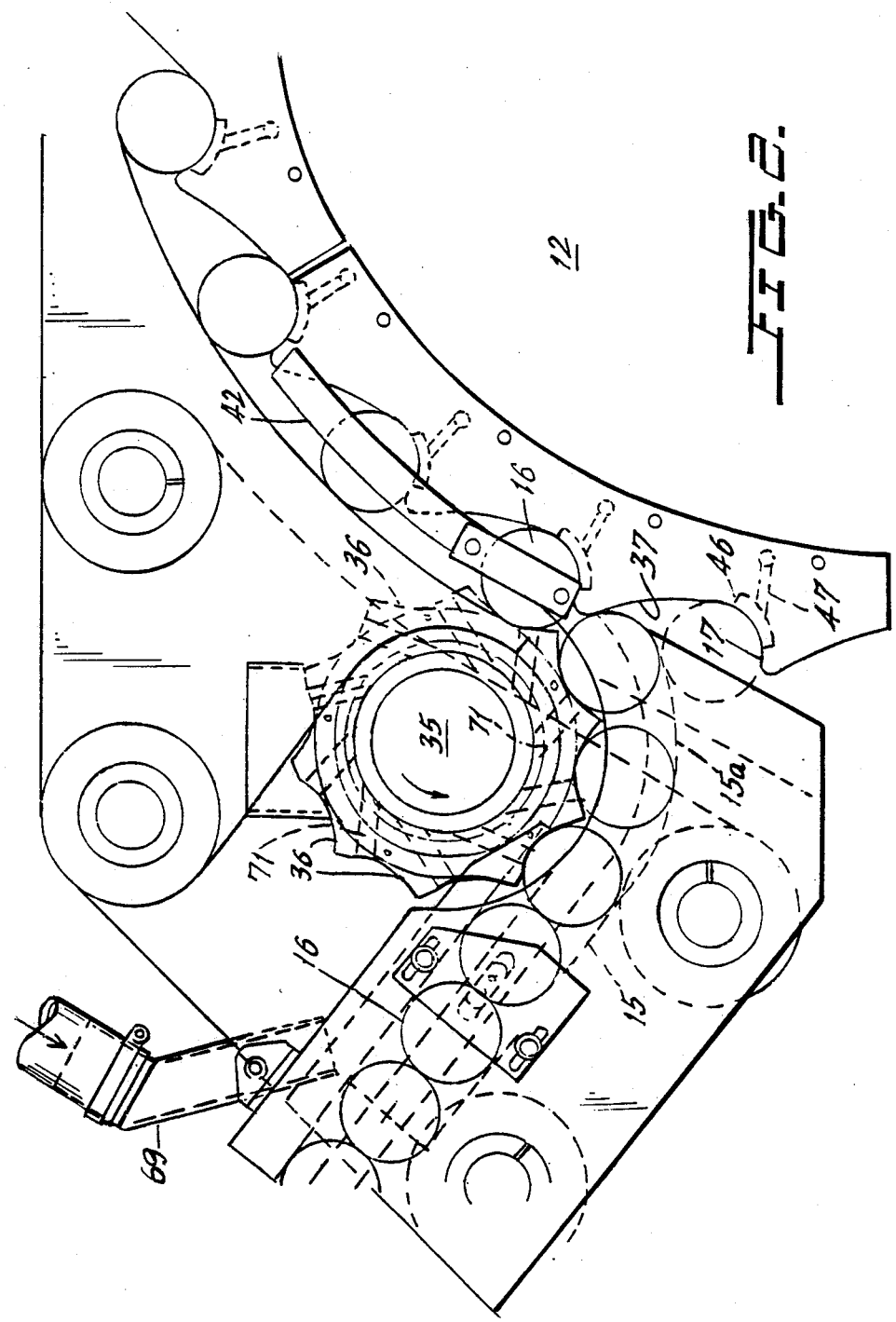

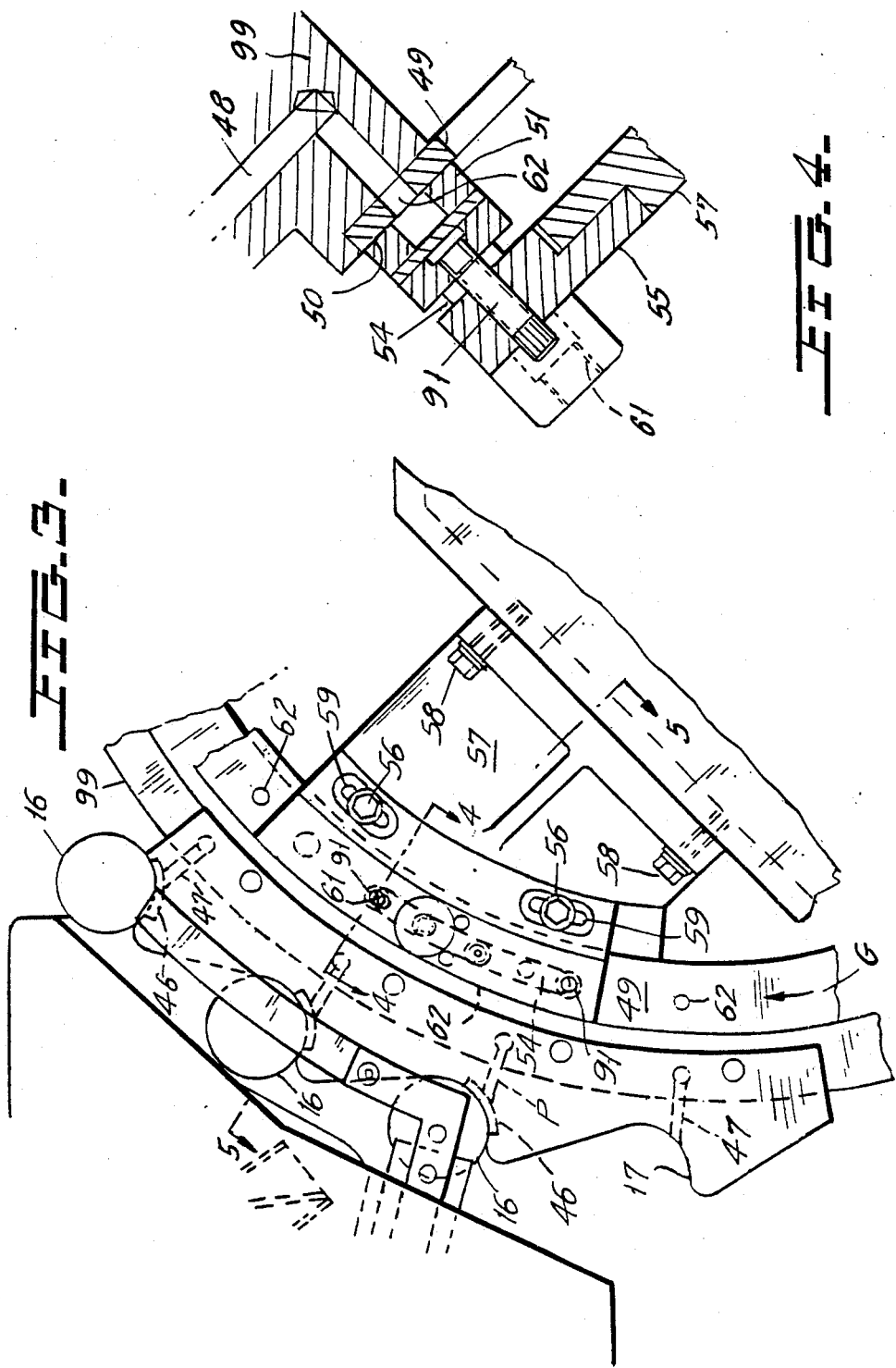

INFEED MEANS FOR HIGH SPEED CONTINUOUS MOTION CAN DECORATOR

BACKGROUND OF THE INVENTION

This invention relates to feeding apparatus for delivering cans from a feed chute to a mandrel wheel that is continuously rotating at very high speed, and is an improvement over the apparatus disclosed in U.S. Pat. No. 4,458,804 issued July 10, 1984 to R. Williams and A. Rohr for Contour Infeed Means For Continuous Motion Can Decorator dramatically.

Continuous motion high speed can decorating apparatus of the type illustrated in U.S. Pat. Nos. 3,563,170, 3,766,851 and 3,976,187 utilize freely rotatable mandrels to carry cans while decorations are applied to the latter. The cans are loaded on the mandrels from a continuously rotating pocket wheel having curved seats or pockets along the periphery thereof to receive undecorated cans from a feed chute that extends from a supply source. Typically, there is a feed screw and star wheel combination interposed between the supply source and the pocket wheel to space the undecorated can before they reach the pocket wheel.

At high speeds, say greater than of 800 cans per minute, the likelihood of cans being damaged by the feed screw or being jammed thereat increases dramatically. In attempting to avoid this problem, the prior art replaced the lead screw by a star wheel having vacuum applied to the pockets thereof in a timed sequence. While this resulted in spacing the cans prior to placement thereof into the pockets of the pocket wheel this did not provide a complete solution at high speeds since only very limited time was available to fully seat each can before it was directed axially to be picked up by a mandrel. Thus, the prior art found it necessary to experiment with modifying the pocket wheel surfaces leading into the pockets thereof, as described in U.S. Pat. No. 4,458,804. Unfortunately, at very high can speeds, say greater than 1200 cans per minute, the time for a can to become seated in a pocket wheel pocket is so short that axial movement of the can toward a mandrel commenced before the can was fully stabilized in the pocket. This resulted in misloading cans and/or damaging same.

SUMMARY OF THE INVENTION

To avoid the aforesaid problems encountered by the prior art in loading cans on mandrels of a continuous motion decorator operating at very high speed, the instant invention provides quick acting means to stabilize each can as it reaches a fully seated position in a pocket wheel pocket. In this fully seated position a can is in precise axial alignment with a mandrel as soon as the can begins moving toward the mandrel. This quick acting means is a suction force that is applied in a timed sequence to a limited area of each pocket wheel pocket from the time of initial full seating of a can until this can moves axially toward the mandrel wheel.

Accordingly, a primary object of the instant invention is to provide improved means for loading undecorated cans in the pockets of a continuously rotating pocket wheel for a continuous motion decorator.

Another object is to provide loading means of this type which achieves improved operation at extremely high speeds.

Still another object is to provide loading means of this type in which cans in the pocket wheel pockets are held by a suction force prior to being pushed to mandrel on a rotating wheel.

A further object is to provide loading means of this type in which there is a relatively short angular travel for each pocket between a loading region where the pocket receives a can and a transfer regions where the can is removed from the pocket and loaded on an axially displaced mandrel.

BRIEF DESCRIPTION OF THE DRAWINGS

These objects as well as other objects of this invention shall become readily apparent after reading the following description of the accompanying drawings in which:

FIG. 2 is an enlarged fragmentary portion of FIG. 1 in the loading region where cans are received by the pocket wheel.

FIG. 3 is another enlarged fragmentary portion of FIG. 1 which includes a side elevation of the valving means through which a suction stabilizing force provided by suction is applied to the pockets of the pocket wheel.

FIGS. 4 and 5 are enlarged fragmentary cross-sections taken through the respective lines 4—4 and 5—5 of FIG. 3 looking in the directions of the respective arrows 4—4 and 5—5.

DETAILED DESCRIPTION OF THE DRAWINGS

Figure 1:
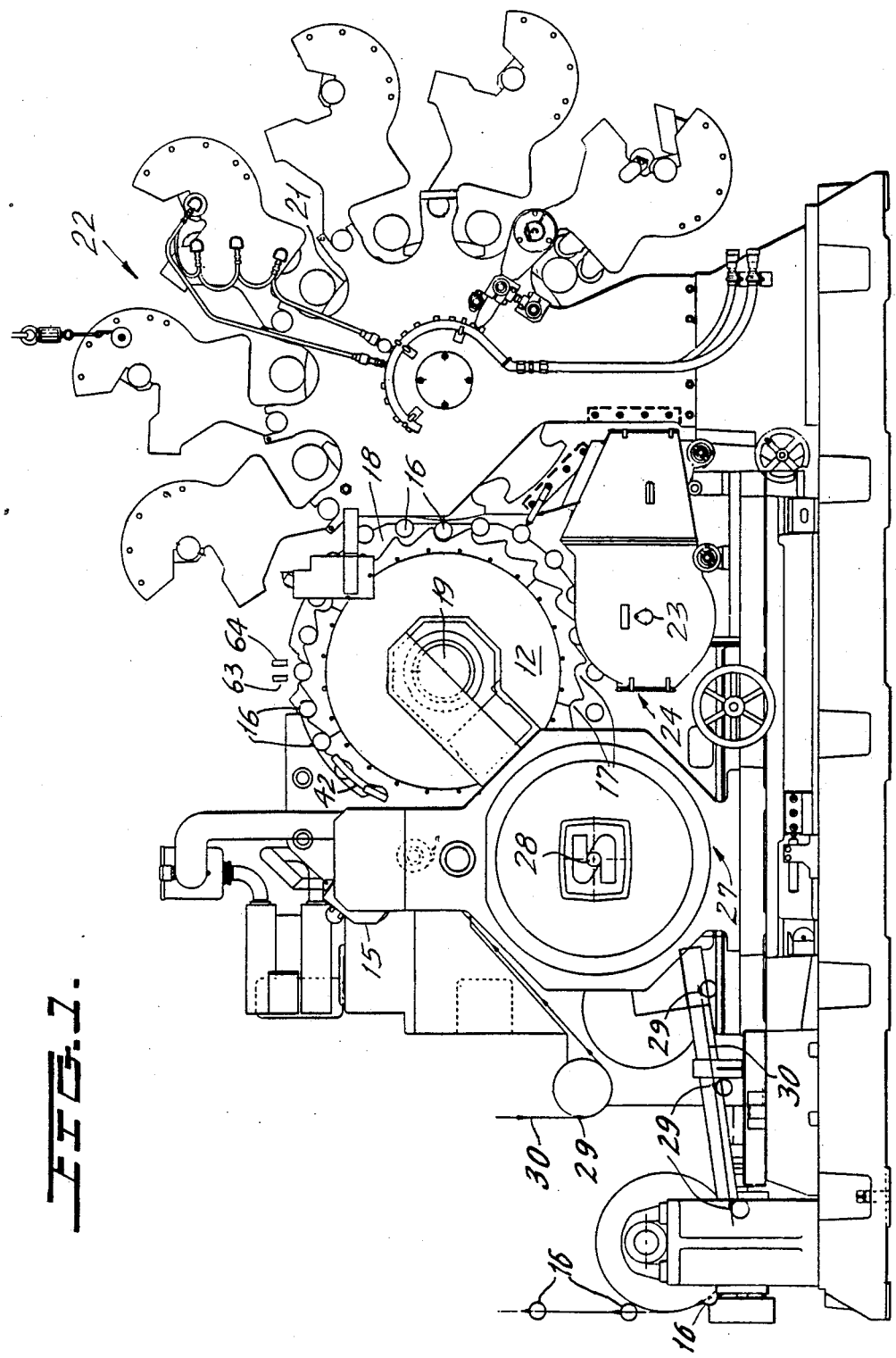
FIG. 1 is a front elevation of continuous motion can decorating apparatus constructed in accordance with teachings of the instant invention.

Now referring to the Figures and more particularly to FIG. 1 which illustrates continuous motion cylindrical container decorating apparatus of the general type descried in U.S. Pat. No. 4,140,053, issued Feb. 20, 1979, to J. P. Skrypek et al. for a Mandrel Mounting and Trip Mechanism For Continuous Motion Decorator Briefly, the apparatus of FIG. 1 includes infeed conveyor chute 15 which receives cans 16 (FIG. 2) from a supply (not shown) and directs them to arcuate cradles or pockets 17 along the periphery of spaced parallel rings 13, 14 (FIG. 5) secured to rim portion 99 of pocket wheel 12. The latter is fixedly secured to carrier wheel 18 which in turn is keyed to continuously rotating horizontal drive shaft 19. Horizontal spindles or mandrels 20 (FIG. 5) are also mounted to wheel 18. Each spindle 20 is in spaced axial alignment with an individual pocket 17 in a short region extending downstream from infeed conveyor 15. Undecorated cans 16 are transferred from each pocket 17 to a mandrel 20 by wiping against stationary arm 42 (FIG. 2) which is angled inwardly in the downstream direction so as to function as a cam that drives can 16 horizontally (axially) toward mandrel 20. Suction applied through an axial passage 45 extending to end 86 of mandrel 20 which receives container 16 draws the latter to final seating position on mandrel 20.

While mounted on mandrels 20, cans 16 are decorated by being brought into engagement with continuously rotating image transfer mat or blanket 21 of the multicolor printing press indicated generally by reference numeral 22. Thereafter, and while still mounted on mandrels 20, each decorated can 16 is coated on the outside thereof with a protective film of varnish applied by engagement with the periphery of rotating applicator roll (not shown) in the overvarnish unit indicated generally by reference numeral 24, on shaft 23 thereof as a center. Cans 16 with decorations and a protective coating thereon are then transferred from mandrels 20 to suction cups (not shown) mounted along the periphery of rotating transfer wheel (not shown) of transfer unit 27, and rotates on shaft 28 thereof as a center. Cans 16 carried by transfer wheel 27 are deposited on generally horizontal pins 29 carried by chain-type output conveyor 30 which carries cans 16 through a curing oven (not shown).

Each mandrel 20 must be loaded with a can 16 by the time mandrel 20 is in the proximity of sensors 63, 64 which detect whether the particular mandrel 20 contains a properly mounted can 16. If sensors 63, 64 detect that a mandrel 20 is unloaded or is not properly loaded, as this mandrel 20 passes through the decorating zone wherein printing blanket 21 normally engages cans 16 on mandrels 20, as explained in the aforesaid U.S. Pat. No. 4,140,053, this misloaded or unloaded mandrel 20 is moved to a "no-print" position wherein as this mandrel 20 moves through the decorating zone it will be spaced from the periphery of blanket 21.

In the embodiment of FIGS. 1 through 5, as cans 16 reach the arcuate downstream end of chute 15 they are engaged by starwheel 35 which is driven to rotate in synchronism with pocket wheel 12. Equally spaced depressions 36 in the periphery of starwheel 35 act to space cans 16 from one another prior to engagement of the most downstream can 16 in chute 15 with lead-in surface 37 that extends downstream from each pocket 17. In a manner known to the art, as lead-in surface 37 proceeds toward pocket 17 upstream thereof, surface 37 moves toward axis 19 about which pocket wheel 12 rotates. This serves to guide can 16 into pocket 17, and when can 16 is fully seated therein a suction stabilizing force is applied thereto, which force is applied until the closed end of can 16 is engaged by arm 42 which pushes can 16 to the near end of mandrel 20 that is axially aligned with can 16 and from that point on suction applied through passage 45 draws can 16 axially until it is fully seated on mandrel 20.

An individual vacuum passage 71 extends radially inward from each depression 36 of starwheel 35 near the downstream end of depression 36. Suction is applied to each passage 71 when can 16 initially enters depression 36, the suction force serving to draw can 16 downstream in depression 36 and establish a uniform spacing between adjacent cans 16, 16 prior to engagement thereof with lead in surface 37. In a typical construction, when cans 16 having a diameter of generally in the range of 2 to 4 inches, with a typical can having a diameter of about 2.6 inches, are being decorated, starwheel 35 establishes a center to center distance of three inches between adjacent cans 16 and the center to center spacing between adjacent pockets 17 on pocket wheel 12 is 5.25 inches. A blower (not shown) drives air out of the lower open end of conduit 69 and directs this airflow against the sides of cans 16 in chute 15 to urge these cans downstream toward starwheel 35.

Figure 5:
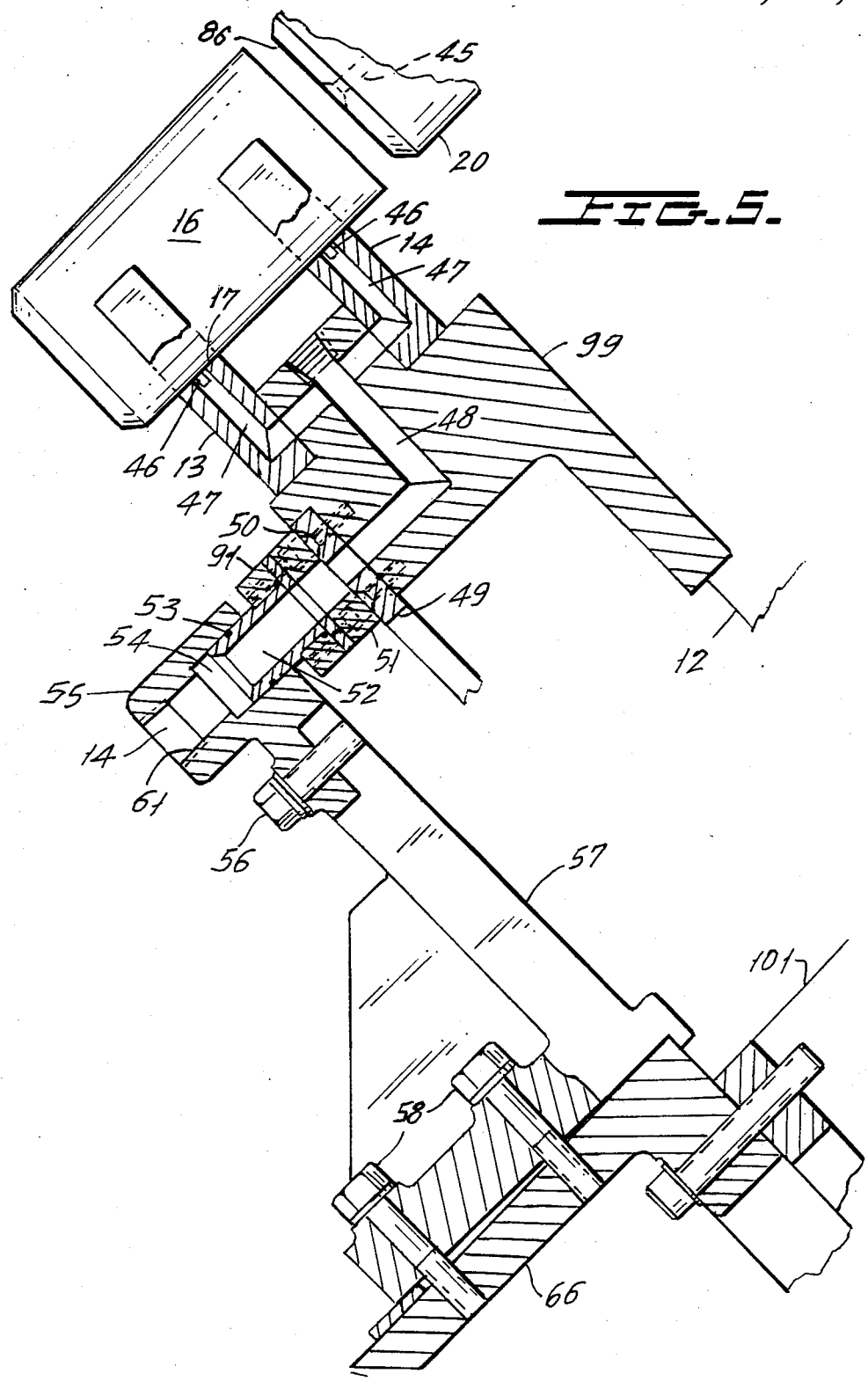

When a can 16 is initially seated in pocket 17 a suction holding force is applied thereto at depression 46, there being a depression 46 in each of the aligned sections of pocket 17 in rings 13 and 14. Suction is applied to each section of depression 46 through an individual L-shaped passage 47 (FIG. 5). Both passages 47 communicate through single L-shaped passage 48 in pocket wheel rim 99 to the generally exposed valving surface of movable valve ring 49 that is secured to rim 99. Ring 49 engages stationary valve element 51 at interface 50. Element 51 partially defines arcuate manifold 52 that is surrounded by seal 53 and is biased horizontally toward valve ring 49. Horizontal movement of element 51 is stabilized by adjusting screws 91 that project from element 51 near opposite ends thereof. The side of manifold 52 remote from interface 50 extends into arcuate depression 54 of adjustable valve element 55 that is mounted by two bolts 56 to bracket 57. The latter is secured by two bolts 58 to bracket 66 which in turn is secured to stationary frame 101. Bolts 56 extend through short arcuate slots 59 in element 55 to permit limited adjustment of valving manifold 52, 55 relative to frame 101. A suction pump (not shown) is connected to manifold element 55 at threaded inlet 61 thereof. Reference numerals 62 indicate the apertures in movable valve ring 49 through which vacuum is applied to suction passages 48 in rim 99 of pocket wheel 12. The length of manifold 52 is such that the suction holding force acting to stabilize can 16 fully seated in pocket 17 is discontinued at the time there is initial engagement between pusher arm 42 and can 16, as arm 42 moves axially toward cradle 20.

Figure 6:
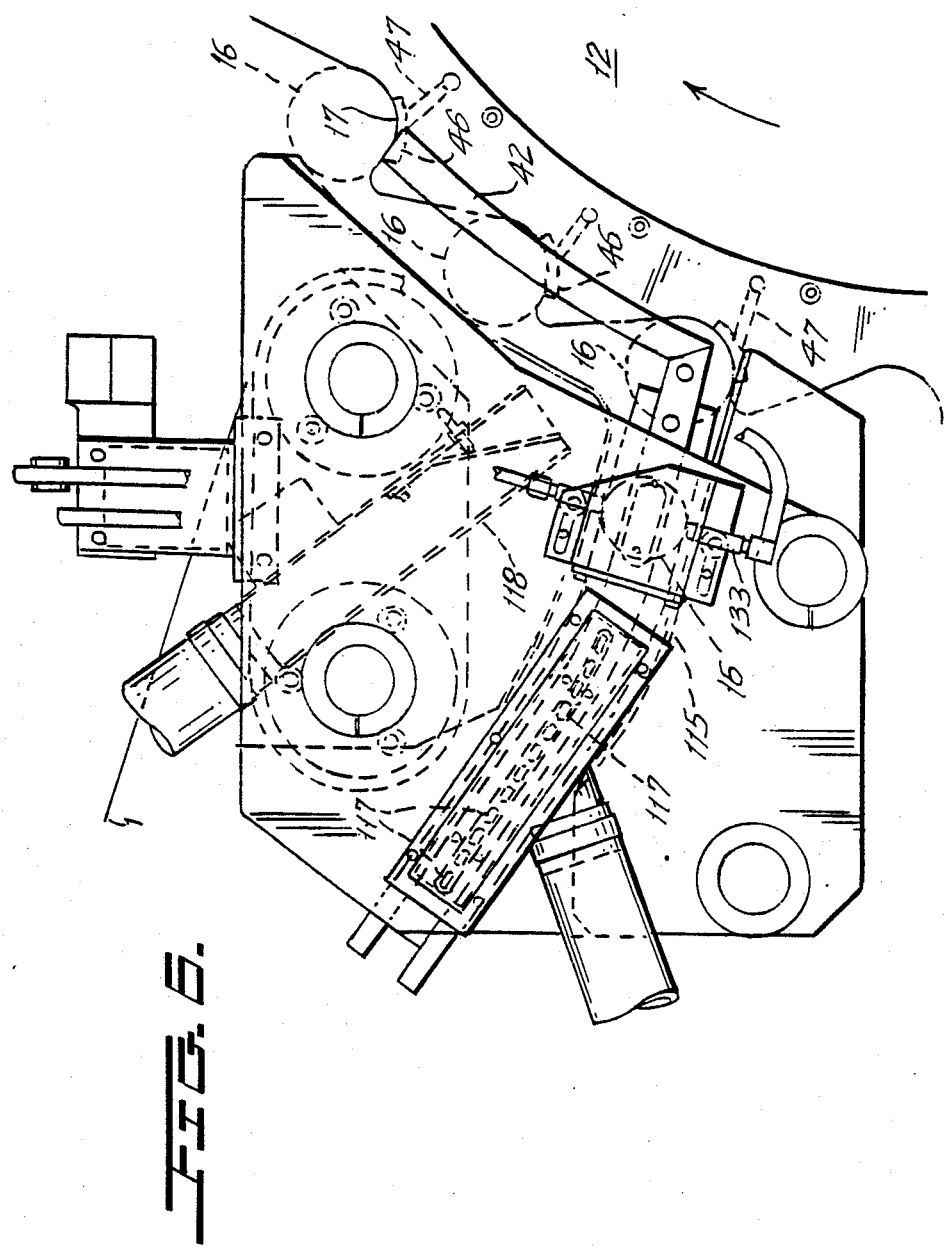
FIG. 6 is a view similar to FIG. 2 showing a modified construction at the downstream end of the feed chute that directs cans to the pocket wheel.

In the embodiment of FIG. 6, starwheel 35 of FIGS. 1 through 3 is eliminated and infeed chute 115 is constructed so that at the downstream end thereof cans 16 are moving downward as contrasted with downstream end 15a of chute 15 which curves slightly upward. Nozzle 117 directs airflow to the interior of chute 115 and in a downstream direction to impinge on cans 16 in chute 115 and urge them downstream. When the most downstream can 16 in chute 115 contacts lead-in surface 37 the sidewall of this can is still engaged by the sidewall of the next upstream can in chute 115, which in turn has its sidewall engaged by the sidewall of the third most downstream can in chute 115. Because of this, the force exerted by air exiting from nozzles 117 urges the most downstream can in chute 115 to remain against lead in surface 37 and be guided into a fully seated position within pocket 17 at which time suction force applied at pocket depression 46 acts to stabilize can 16 fully seated in pocket 17. A blower (not shown) directs air through conduit 118 to exit therefrom at its lower end in the region where cans 16 are loaded onto pocket wheel 12. The generally downward force provided by airflow from the lower end of conduit 118 acts to stabilize cans 16 as they reach the downstream end of delivery chute 117 and are being loaded into pockets 17 of pocket wheel 12. In FIG. 6 the next most downstream can 16 in chute 115 is shown spaced from the next downstream can 16 because gate 133. The latter will remain closed at least until there is a significant head of cans upstream of the can 16 that is being blocked by gate 113.

Typically the spacing between center 19 of pocket wheel 12 and the centers about which the arcs defining pockets 17 are drawn is approximately 20 to 40 inches. In a practical construction, pocket wheel 12 has twenty-four equally spaced pockets 17 formed by arcs drawn about centers that are 20 inches from center 19 of wheel 12. The application of suction to each pocket 17 takes place from the point where a can 16 is initially fully seated in pocket 17 and is discontinued immediately prior to engagement of wiper blade or cam 42 with can 16. In all, suction is applied to each pocket 17 for approximately 15 to 30 degrees of rotation for pocket wheel 12.

Although a preferred embodiment of this invention has been described, many variations and modifications will no be apparent to those skilled in the art, and it is therefore preferred that the instant invention be limited not by the specific disclosure herein, but only by the appending claims.

What is claimed is:

1. Very high speed apparatus for decorating cylindrical objects constituted by cans having a diameter generally in the range of 2 to 4 inches, said apparatus including:
   a rotating mandrel wheel and a plurality of angularly spaced mandrels mounted on said mandrel wheel;
   a rotating pocket wheel coaxial with said mandrel wheel and having a plurality of equally spaced peripheral pockets equal in number to said plurality of mandrels;
   said pocket wheel being provided along its periphery with a plurality of lead-in surfaces to direct cylindrical objects into said pockets;
   each of said lead-in surfaces extending downstream from an individual one of said pockets and gradually retreating radially inward as it approaches the pocket into which the particular lead-in surface directs cylindrical objects;
   first means for engaging cylindrical objects in said pockets as they pass angularly through a transfer region and directing them axially toward said mandrels for loading thereon while said wheels are rotating at full speed;
   second means for conveying cylindrical objects in side by side relationship and delivering same to said pocket wheel for loading in said pockets at a loading region upstream of said transfer region;
   third means to apply a suction force to cylindrical objects, with application of said suction force to cylindrical objects being initiated after they are seated in said pockets to stabilize said objects therein while they are carried to said transfer region by said pocket wheel and until such objects are engaged by said first means for transfer to said mandrel; and
   cylindrical objects while moving along said lead-in surfaces toward said pockets being free of said suction force.

2. Apparatus as set forth in claim 1 in which said suction force is applied by said third means to each pocket for approximately 15° to 30° of rotation for said pocket wheel.

3. Apparatus as set forth in claim 1 in which application of said suction force to a cylindrical object is discontinued while it is engaged by said first means.

4. Apparatus as set forth in claim 1 in which each pocket travels upward in moving from the loading region to the transfer region.

5. Apparatus as set forth in claim 1 in which the second means includes a guide chute having a downstream end at said loading region;
   said second means also including a section which urges cylindrical objects in said chute toward the downstream end thereof.

6. Apparatus as set forth in claim 5 in which said section of said second means provides air flow that is directed downstream with respect to said chute and impinges upon sidewalls of cylindrical objects moving therealong.

7. Apparatus as set forth in claim 5 in which said section of said second means includes a starwheel rotating in synchronism with said pocket wheel;
   said starwheel operatively positioned to engage cylindrical objects moving downstream in said chute;
   said cylindrical objects being released from said starwheel upon being seated in said pockets;
   prior to reaching said starwheel, adjacent cylindrical objects in said chute having their sidewalls in engagement;
   said starwheel having peripheral pockets which receive said cylindrical objects to arrange the latter with a predetermined spacing as they are delivered to said loading region.

8. Apparatus as set forth in claim 7 in which said section of said second means also provides air flow that is directed downstream with respect to said chute and impinges upon sidewalls of cylindrical objects moving therealong.

9. Apparatus as set forth in claim 7 in which a radially inward suction force is applied to each pocket of said starwheel for predetermined angular positions thereof, being discontinued at a point prior to full seating of a cylindrical object in a pocket of said pocket wheel.

10. Apparatus as set forth in claim 1 in which the first means comprises a stationary cam means;
    said cylindrical objects while being carried through said transfer region by said pocket wheel having their ends remote from said mandrels wipe across said cam element which is disposed to direct said cylindrical objects axially toward said mandrels.

11. Apparatus as set forth in claim 10 in which the cam means is elongated and angles toward said mandrels in a downstream direction.

12. Apparatus as set forth in claim 10 in which application of said suction force to a cylindrical object is discontinued while it is engaged by said first means.

13. Apparatus as set forth in claim 2 in which the first means comprises a stationary cam means;
    said cylindrical objects while being carried through said transfer region by said pocket wheel having their ends remote from said mandrels wipe across said cam element which is disposed to direct said cylindrical objects axially toward said mandrels.

14. Apparatus as set forth in claim 7 in which the first means comprises a stationary cam means;
    said cylindrical objects while being carried through said transfer region by said pocket wheel having their ends remote from said mandrels wipe across said cam element which is disposed to direct said cylindrical objects axially toward said mandrels.

15. Apparatus as set forth in claim 9 in which the first means comprises a stationary cam means;
    said cylindrical objects while being carried through said transfer region by said pocket wheel having their ends remote from said mandrels wipe across said cam element which is disposed to direct said cylindrical objects axially toward said mandrels.

16. Apparatus as set forth in claim 15 in which the cam means is elongated and angles toward said mandrels in a downstream direction.

* * * * *